United States Patent [19]

Batz

[11] 4,081,748
[45] Mar. 28, 1978

[54] FREQUENCY/SPACE DIVERSITY DATA TRANSMISSION SYSTEM

[75] Inventor: James E. Batz, Northbrook, Ill.

[73] Assignee: Northern Illinois Gas Company, Aurora, Ill.

[21] Appl. No.: 701,901

[22] Filed: Jul. 1, 1976

[51] Int. Cl.² ............................................. H04B 7/02
[52] U.S. Cl. ...................................... 325/56; 325/47; 325/59
[58] Field of Search ...................... 325/31, 47, 55, 56, 325/59, 154, 156; 340/224; 343/200, 205, 207, 208

[56] References Cited

U.S. PATENT DOCUMENTS

| | | | |
|---|---|---|---|
| 2,278,779 | 4/1942 | Hansell | 325/47 |
| 2,549,423 | 4/1951 | Carlson | 325/59 |
| 2,568,408 | 9/1951 | Peterson | 325/154 |
| 3,361,970 | 1/1968 | Magnuski | 325/304 |
| 3,408,572 | 10/1968 | Wolf et al. | 325/163 |
| 3,662,268 | 5/1972 | Gans et al. | 325/56 |

*Primary Examiner*—Robert L. Griffin
*Assistant Examiner*—Marc E. Bookbinder
*Attorney, Agent, or Firm*—Emrich, Root, O'Keeffe & Lee

[57] ABSTRACT

A frequency/space diversity data transmission system includes a transmitter for transmitting two or more distinct RF signals having the same modulation from different antennas separated a wavelength or more, the frequency spacing of the carrier signals being at least ten times greater than the frequency of the modulating signal, and a broad band receiver including a video diode detector and a frequency demodulator which recovers the modulating frequency from the carrier.

13 Claims, 7 Drawing Figures

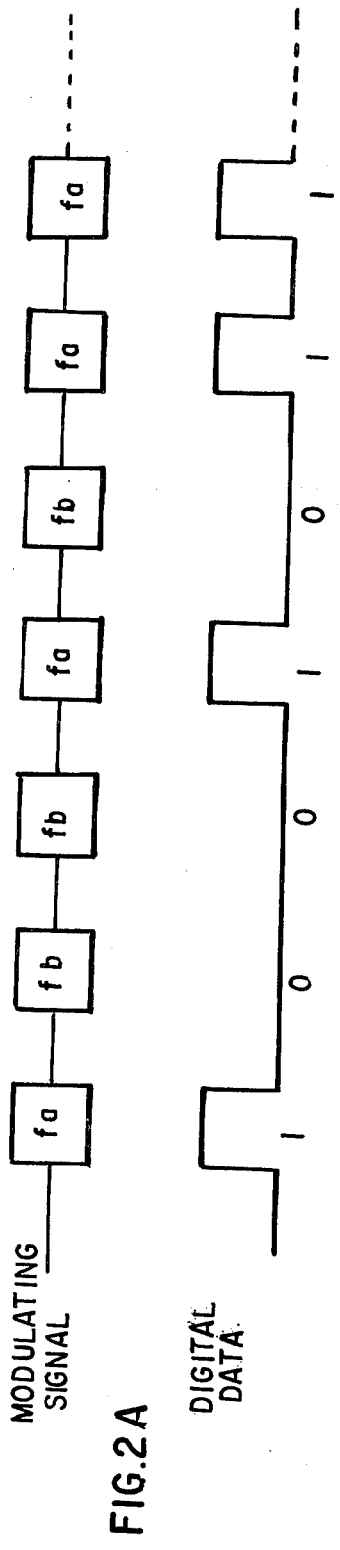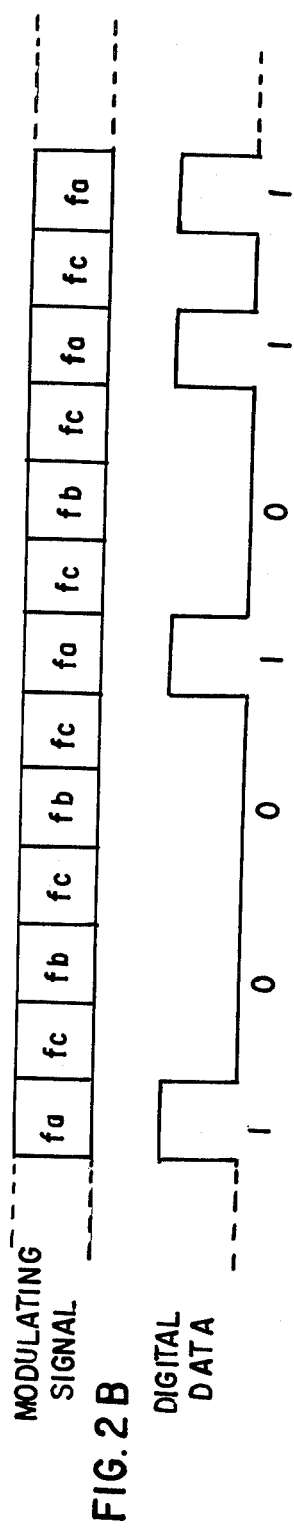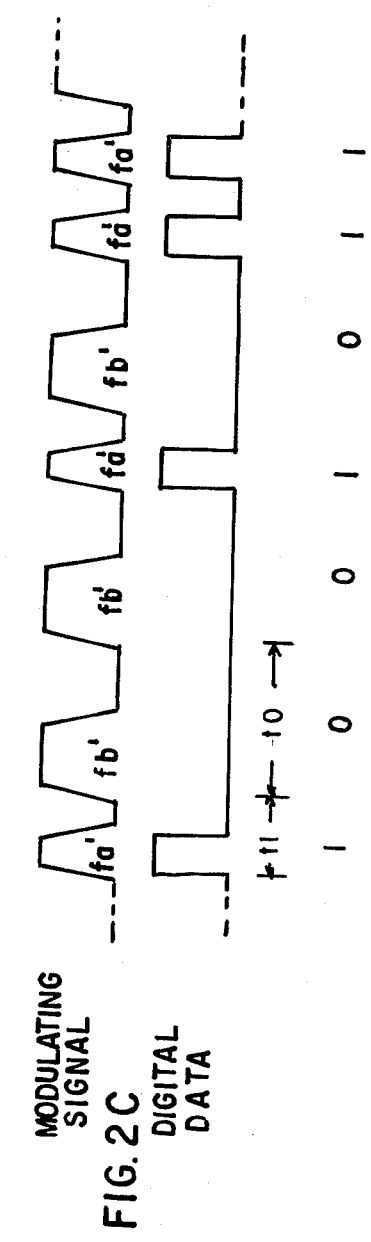

FREQUENCY/SPACE DIVERSITY DATA TRANSMISSION SYSTEM

BACKGROUND OF THE INVENTION

1. Field of the Invention

This invention relates to diversity transmission systems, and more particularly, to a diversity system for transmitting digital data over short distances between a mobile transmitter and a fixed receiver.

2. Description of the Prior Art

When a signal is transmitted from a mobile transmitter at one point to a receiver at another point in a complex environment where propagation is primarily by re-radiation from a multitude of scattering points, several rays of the transmitted signal will experience different diverse paths before arriving at a receiver antenna.

When the signal received is composed of two rays transversing different path lengths such that one path is odd multiples of one-half wave length longer than the other, a dip in the received signal will occur. When the two paths differ in length by multiples of one wave length, an increase in the signal received will occur. As the distance between the two points of communication is increased, the spatial separation of the dips or nulls approach one wavelength. Thus, such path diversity gives rise to a succession of peaks and nulls in the signal detected at the receiver as the distance between the transmitter and receiver changes, resulting in fading in the received signal, distortion of the received intelligence, or a combination of both depending upon the differences in the path lengths traversed by the transmitted signal and the nature of the intelligence.

Diversity transmission systems have been employed to circumvent problems in communication between two remote points caused by signals from the transmitting location travelling over paths of different lengths recombining at the receiving location. The most common forms of diversity reception are space and frequency.

One example of a system utilizing a form of frequency diversity is disclosed in the U.S. Pat. No. 3,361,970 to H. Magnuski. The system, which is intended to provide a communication link between computing machines and apparatus situated in different cities, employs two separate transmitting-receiving channels separated by a large frequency to avoid fading and coincidence problems. In a disclosed embodiment, carrier signals at different frequencies are modulated by signals from a single modulating supply and transmitted to a receiving location. The transmitted signals are detected by a pair of receivers, each tuned to a different frequency, and a signal selector at the output of the receivers selects the strongest signal received.

A system employing space diversity is disclosed in the U.S. Pat. No. 3,348,150 to Atal et al. In this system, a single RF carrier frequency is used, and voice signals are separated into several redundant channels and used to modulate the carrier frequency. The resultant signals are supplied to separate widely spaced antennas for transmission to a receiver. The receiver demodulates the signals and produces a combination of the filtered speech signals.

While various frequency and space diversity systems have been proposed in the prior art, each system is usually tailored to a specific application, and generally some compromise must be made to obtain satisfactory operation for such application. Thus, a diversity system designed for one application may not be at all suitable for another application. Considering, for example, a remote meter reading system, in such system, coded interrogate signals are transmitted from an interrogate source, which may be fixed or mobile, to transponders associated with utility meters. Each transponder responds to a selected interrogate signal to transmit to the interrogate source a reply signal indicating a reading of the associated meter. When a mobile interrogate source is employed, fading may occur in the signal received by the transponder as the separation between the interrogate source and the transponder changes. This is caused by the multiplicity of propagation paths taken by the signal as a result of the electrically obscured environment of the transponder location.

Although a frequency diversity system of the type shown by Magnuski, for example, would avoid the effects of fading due to multipath propagation, the need to provide two receivers and a complex combining network at each meter installation would make such system uneconomical for remote meter reading applications where the large number of receivers required dictate a need for a simple low cost receiver.

The system shown by Atal et al is practical for the transmission of voice signals where only a small portion of the spectrum is needed for intelligibility. However, such system would not be suitable for the transmission of digital data over short distances as in a remote meter reading system.

Therefore, it would be desirable to have a diversity transmission system including a simple low cost receiver which enables reliable transmission of digital data between a mobile transmitting source and the receiver, as in a remote meter reading system.

SUMMARY OF THE INVENTION

It is therefore an object of the present invention to provide a transmission system which increases the reliability of communication between a mobile transmitter and a fixed receiver.

It is another object of the invention to provide a diversity transmission system employing a simple low cost receiver.

Another object of the invention is to provide a diversity transmission system for use in a remote meter reading system for transmitting digital interrogation data from a mobile interrogate source to a fixed transponder associated with a utility meter to effect the readout of the meter reading.

These and other objects are achieved by the present invention which has provided a diversity transmission system including transmitter means having at least first and second carrier signal generating means operable to provide carrier signals at a respective first and second frequencies and modulator means for modulating the first and second carrier signals with the same information signals to permit the transmission of information to a receiving location. The system further includes receiver means at the receiving location having means for receiving the modulated signals transmitted by the transmitter means, detector means responsive to the received signals to provide output signals including signals at the frequency of the the information signals, and demodulator means responsive to the information signals provided by the detector means to provide digital signals representing the information.

In the system of the present invention, frequency diversity is obtained by transmitting two or more RF signals having the same modulation from separate transmitting antennas which are spaced a wavelength or more. Different carrier frequencies are used for each signal and information signals amplitude modulate the carrier signals with the information to be transmitted. In a disclosed embodiment wherein the information signals are FSK tone signals, the carrier frequencies are chosen so that their difference is greater than approximately ten times the frequency of the modulating signal, or the data rate for single cycle FSK modulation.

The receiver means has a bandwidth which is wide enough to accept the RF carriers and the modulation sidebands, thus providing optimum sensitivity and noise rejection. In a disclosed embodiment, the receiver means comprises a crystal video receiver which by nature provides sufficient bandwidth to allow reception of the transmitted carrier signals without further increasing the receiver bandwidth, so there is no additional loss in sensitivity. The detector means and the demodulator means permit recovery of the transmitted information at the receiving location.

When the modulated carrier signals received by the receiver are of equal strength, a three DB increase is provided in the resultant output signal level of the receiver. As one of the modulated carrier signals experiences a fade, the remaining signal predominates, and the output of the receiver is approximately equal to stronger of the two signals, but is never less than the strongest signal received from a single transmitting antenna.

The combined diversity technique employed in the system of the present invention permits the use of a small low-cost receiver requiring only one receiving antenna, and permits reception of two or more modulated carriers in a common receiver. The system of the present invention is practical for transmission of FSK data, by a transmitter which is fixed or mobile, and is particularly suitable to applications where such transmission is effected over short ranges as in a remote meter reading system.

DESCRIPTION OF THE DRAWINGS

FIGS. 2A–2C are representations of different modulation formats which may be employed in the system shown in FIG. 1;

DESCRIPTION OF A PREFERRED EMBODIMENT

Figure 1:
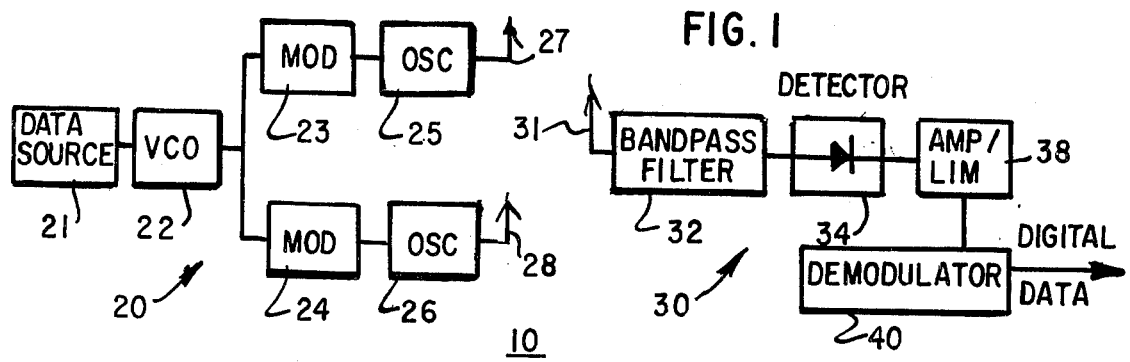
FIG. 1 is a block diagram of a diversity transmission system including a transmitter and a receiver provided by the present invention.

Referring to the drawings, FIG. 1 is a block diagram for a transmitter 20 and a receiver 30 which comprise a diversity transmission system 10 provided by the present invention. The system 10 is particularly suited for transmitting digital data over short distance on the order of a mile or less. By way of illustration, the system 10 is described with reference to an application in a remote meter reading system.

In such application, the transmitter 20, forms part of an interrogate source and is operable to transmit interrogate data to the receiver 30, which is incorporated into a data transponder that is connected to a register associated with a functional device, such as a utility meter, a business machine, or the like, to be read out. The interrogate signals provided by the transmitter 20 enable such transponder to provide reply data signals which represent the reading of the meter and to transmit the reply data to a receiver at the interrogate source. The interrogate source may be fixed or mobile, and in the latter case, the transmitter 20 is located in a moving vehicle which is driven past meter installations.

In the system of the present invention, frequency diversity is obtained by transmitting two or more RF signals at different carrier frequencies and having the same modulation from different antennas separated a wavelength or more. In the illustrative embodiment, the carrier signals are amplitude modulated by information signals, which may be FSK tone signals, at first and second frequencies, to provide the coding for the interrogate data. Only two carrier frequencies and two antennas are considered for simplicity.

Referring to the transmitter 20, interrogate data in digital form from a data source 21 is fed to a voltage controlled oscillator 22 which provides FSK tone signals representing the data. The FSK tone signals may be in the range of 1 KHz to 10 KHz.

FIGS. 2A–2C show different modulation formats which may be employed in the system 10. For example, the voltage controlled oscillator 22 may provide FSK tone signals at a frequency fa, such as 3 KHz, to represent each logic 1 level data bit, and at a frequency fb, such as 2 KHz, to represent each logic 0 level data bit, as shown in FIG. 2A. The tone signals representing the data bits are provided for a predetermined duration, which may be 3.5 milliseconds, and successive tone signals are spaced apart a like duration.

In FIG. 2B, there is shown a similar modulation format wherein a "rest" tone, at a frequency $fc$, such as 2.5 KHz, is provided between the tone signals which represent the data to make the data self-clocking at the receiver 30.

In FIG. 2C, there is shown a modulation format which employs trapezoidally shaped FSK signals at frequencies $fa'$ and $fb'$ which afford single cycle modulation. That is, each cycle of oscillation has a digital significance, and only one cycle of the tone signal is required to designate a binary state as shown in FIG. 2C. In this example, frequencies $fa'$ and $fb'$ may be 5 KHz and 2.5 KHz, respectively. Each tone signal at frequency $fa'$ defines a 200 microsecond period $t1$ representing a logic 1 level bit, and each tone signal at frequency $fb'$ defines a 400 microsecond period $t0$ representing a logic 0 level bit as indicated in FIG. 2C.

The FSK signals are supplied to a pair of modulator circuits 23 and 24 which amplitude modulate carrier signals provided by oscillators 25 and 26 at frequencies $f1$ and $f2$ respectively. The carrier frequencies $f1$ and $f2$ may be in the range of 400 MHz to 1000 MHz. The carrier frequencies f1 and f2 are chosen so that their difference is greater than ten times the VCO frequency for the modulation formats shown in FIGS. 2A or 2B, or the data rate when single cycle modulation is used (FIG. 2C), but within the bandwidth of the input filter 32 of the receiver 30. The FSK modulated carrier signals provided at the outputs of oscillators 25 and 26 are fed to transmit antennas 27 and 28 for radiation toward the receiving antenna 31 of the receiver 30.

The system receiver 30 includes band pass filter or preselector 32, which has an input connected to the receiving antenna 31 and an output connected to an input of a detector stage 34, which may comprise a crystal video diode 39, such as the Type IN82AG. The detector stage 34 is followed by an amplifier/limiter 38, the output of which is connected to a demodulator 40.

The signal level seen by the detector diode 34 is the algebraic sum of all signals received by the receiver antenna 31 which are within the bandpass of the input filter 32. The input filter 32 may be a conventional 400 MHz filter to allow reception of the carrier frequencies $f1$ and $f2$ and modulation sidebands. Frequency separations of 100 KHz to 1 MHz or more for the carrier signals $f1$ and $f2$ are easily within the bandpass of the filter 32. The crystal video receiver is by a nature a broadband device, the RF bandwidth, which may be in the order of 6 MHz, being determined by the input bandpass filter 32. Since the receiver bandwidth is not increased to allow reception of the two transmitted frequencies, no additional loss in sensitivity occurs.

The data rate is determined by the video bandwidth of the receiver and the RF frequency spacing of the modulated interrogation carrier signals. In general, the data rate is in the range of 150 bits/second to 3,000 bits/seconds for the exemplary system. When single cycle FSK modulation is used, the carrier frequencies are chosen so that their difference is ten times the data rate.

The post detection bandwidth of the receiver 30 is approximately 4 KHz to 10 KHz and thus the amplifier-limiter circuit 38 passes only the modulating frequency and its sidebands. The difference frequency which is of a much higher frequency is highly attentuated by the amplifier-limiter circuit 38, and thus causes no interference problem in the demodulator stage 40. The demodulator stage 40 responds to the modulating frequency to provide digital coded signals representing the transmitted information.

In the exemplary embodiment where it is assumed the transmitter 20 is located in a moving vehicle, transmission from the vehicle to the fixed receiving location occurs while the vehicle is in motion at speeds up to 35 MPH. Accordingly, the signal levels seen by the receiver 30 vary as a function of vehicle position relative to the receiving location.

Figure 3:
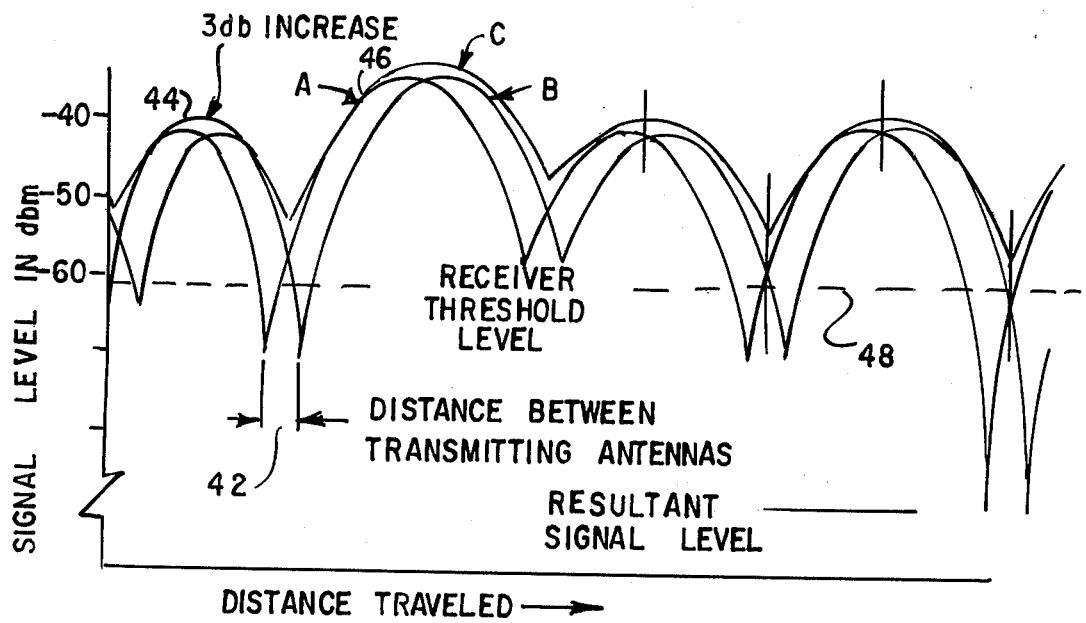
FIG. 3 is a representation of relative signals levels received by the receiver shown in FIG. 1.

Referring to FIG. 3, curves A and B represent the signal levels in $dbM$ received from the transmitter antennas 27 and 28, respectively, as a function of distance travelled by the vehicle. As shown in FIG. 3, such signal levels are approximately identical with the exception of a lateral shift indicated at 42, which is caused by the separation of the two transmitting antennas 27 and 28. This lateral displacement of curve B in relation to curve A assumes that the transmitted carriers are close in frequency and the interrogating distance is short.

Figures 4A, 4B:
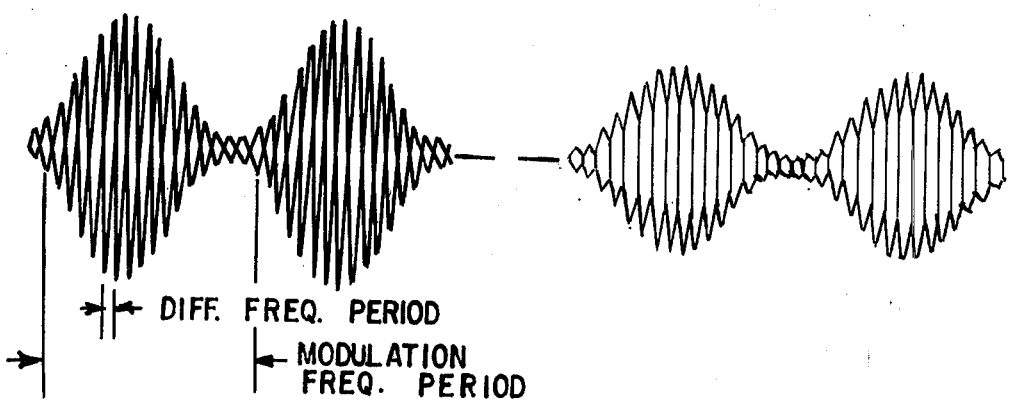
FIGS. 4A and 4B illustrate the signal input to a detector of the receiver for conditions of equal and unequal amplitudes for carrier signals received by the receiver shown in FIG. 1.

The dips in the received signal are caused by reflection of the transmitted signal from objects in the surrounding environment. The resultant signal received at the receiver 30 is the sum of the transmitted signals and is represented by curve C in FIG. 3. When the two modulated carrier signals are of equal strength, a 3DB increase is provided in the resultant signal level over that for a single signal source as indicated at 44. FIG. 4A shows the signal produced at the output of the filter 32 when the carrier frequencies $f1$ and $f2$ are of equal amplitude.

For other conditions, such as for fading of one of the transmitted signals, the resultant signal level is approximately equal to the stronger of the two signal levels, as indicated at 46, but is never less than the strongest signal level received from a single transmitting antenna. As one of the transmitted signals experiences a "fade", the remaining signal predominates, providing the signal shown in FIG. 4B which shows the algebraic sum of the modulated carrier frequencies $f1$ and $f2$ for the condition where the two modulated carrier signals $f1$ and $f2$ are of unequal amplitude.

In either case, a signal of sufficient amplitude is provided to the receiver 30 enabling recovery of the transmitted information from the carrier and as shown in FIG. 3, such signal level is always greater than the receiver threshold level indicated at 48.

Thus, the diversity transmission system 10 provided by the present invention enables the transmission of digital data from a mobile transmitting source to a receiving location and minimizes the effects of fading as may be caused by multipath delay, for example. Also, the crystal video receiver 30, which is by nature a broadband device, enables reception of the two transmitted frequencies without increasing the receiver bandwidth so that no additional loss in sensitivity occurs. Moreover, the receiver 30 is of simple construction and low cost and does not require complex summing networks for summing the transmitted signals to recover the transmitted information, and thus the system 10 is suitable for use in application, such as in a remote meter reading system, wherein a large number of such receivers are required to enable readout of information at a plurality of meter installations.

I claim:

1. In a diversity data transmission system, transmitter means including data source means having means for providing digital signals coded to represent information to be transmitted, and signal means responsive to said digital signals provide output signals at different predetermined frequencies coded to represent said information, at least first and second carrier signal generating means operable to provide carrier signals at respective first and second frequencies, modulating means responsive to said output signals for providing modulating signals at said predetermined frequencies for modulating said first and second carrier signals with the same information to provide first and second modulated carrier signals for transmission to a receiving location, and receiver means at said receiving location including input means for receiving the first and second modulated carrier signals transmitted by said transmitter means, detector means responsive to said first and second modulated carrier signals to provide signals at the frequencies of said modulating signals and their sidebands, amplifier/limiter means connected to an output of said detector means for passing only said modulating signals and their sidebands, and demodulator means connected to an output of said amplifier/limiter means and responsive only to signals at the frequencies of said modulating signals to provide digital signals representing said information.

2. A system as set forth in claim 1 wherein said modulating means includes first and second modulator circuit means, said signal means including voltage controlled oscillator means responsive to said digital signals to provide control signals at third and fourth frequencies, said first and second modulator circuit means being responsive to said control signals provided by said voltage controlled oscillator means to control said first and second carrier signals generating means, respectively, to effect the modulation of said first and second carrier signals.

3. A system as set forth in claim 2 wherein the difference in frequency between said first and second carrier signals is greater than ten times the frequency of one of the signals provided by said voltage controlled oscillator means.

4. A system as set forth in claim 2 wherein said transmitter means is operable to transmit said information at a predetermined data rate and wherein the difference in frequency between said first and second carrier signals is greater than 10 times the data rate.

5. A system as set forth in claim 1 wherein said transmitter means includes at least first and second transmitting antenna means, each individually associated with a different one of said carrier generating means, said first and second transmitting antenna means being separated by at least one wavelength of either carrier frequency.

6. A system as set forth in claim 1 wherein said transmitter means is located within a mobile unit, and wherein the separation between said transmitter means in said mobile unit and said receiving location is less than a mile.

7. A system as set forth in claim 1 wherein the difference in frequency of said carrier signals is in the range of 100 KHz to 1 MHz and wherein said detector means comprises a video detector diode.

8. A system as set forth in claim 7 wherein said input means includes receiver antenna means for receiving said modulated carrier signals and bandpass filter means having a preselected passband, said filter means being interposed between said receiver antenna means and said video detector diode for extending signals within said passband to said video detector diode.

9. A system as set forth in claim 8 wherein the signal level provided at the input of said video detector diode is the sum of all signals within the passband of said input filter means and wherein said signal level is at least equal to the level of the strongest one of the modulated signals received at said receiver antenna means.

10. In a diversity data transmission system, transmitter means including data source means having means for providing digital signals coded to represent information to be transmitted, and signal means responsive to said digital signals to provide output signals at different predetermined frequencies coded to represent said information, at least first and second carrier signal generating means operable to provide carrier signals at respective first and second frequencies, the difference between said first and second frequencies being an integral multiple of at least one of said predetermined frequencies, first modulator means responsive to said output signals for providing modulating signals at predetermined frequencies to effect modulation of one of said carrier signals to provide first modulated carrier signals for transmission to a receiving location, second modulating means responsive to said output signals for providing modulating signals at said predetermined frequencies to effect modulation of the other one of said carrier signals to provide second modulated carrier signals for transmission to said receiving location, and receiver means at said receiving location including detector means responsive to said first and second modulated carrier signals to provide output signals including signals at the frequencies of said modulating signals and their sidebands, amplifier/limiter means connected to an output of said detector means for passing only said modulating signals and their sidebands, and demodulator means connected to an output of said amplifier/limiter means and responsive only to the signals at the frequencies of said modulating signals to provide digital signals representing said information.

11. A system as set forth in claim 10 wherein said transmitter means includes at least first and second transmitting antenna means, each individually associated with a different one of said carrier signal generating means, said first and second transmitting antenna means being separated by at least one wavelength of either carrier frequency.

12. A system as set forth in claim 10 wherein the difference in frequency of said carrier signals is in the range of 100 KHz to 1MHz and wherein said detector means comprises a video detector diode.

13. A system as set forth in claim 12 wherein said receiver means includes receiving antenna means and filter means interposed between said receiving antenna means and an input of said video detector diode for extending signals within a predetermined passband to said input of said video detector diode, the signal level provided at the input of said video detector diode being the sum of all signals within the passband of said filter means, and at least equal to the level of the strongest one of the modulated signals received at said receiving antenna means.

* * * * *